United States Patent
Katcherian

(10) Patent No.: US 7,604,280 B2
(45) Date of Patent: Oct. 20, 2009

(54) DEVICES AND METHODS FOR LOCATING FIXED GLASS PANES ON AUTOMOTIVE VEHICLES

(75) Inventor: Ricky V. Katcherian, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 906 days.

(21) Appl. No.: 11/053,062

(22) Filed: Feb. 8, 2005

(65) Prior Publication Data

US 2006/0174581 A1 Aug. 10, 2006

(51) Int. Cl.
*B60J 10/02* (2006.01)

(52) U.S. Cl. .................................... 296/96.21

(58) Field of Classification Search ............ 52/204.597, 52/208; 296/93, 96.21
See application file for complete search history.

(56) References Cited

U.S. PATENT DOCUMENTS

| | | | | |
|---|---|---|---|---|
| 3,807,107 A | * | 4/1974 | Davis | 52/99 |
| 4,364,209 A | * | 12/1982 | Gebhard | 52/208 |
| 4,379,379 A | * | 4/1983 | Sengoku | 52/208 |
| 4,412,406 A | * | 11/1983 | Sengoku | 52/208 |
| 4,921,297 A | * | 5/1990 | Stevens | 296/96.21 |
| 5,779,297 A | * | 7/1998 | Flauss | 296/93 |
| 5,956,833 A | * | 9/1999 | Davis et al. | 29/281.1 |
| 6,170,208 B1 | * | 1/2001 | Lambiris | 52/204.597 |
| 6,241,304 B1 | * | 6/2001 | Frost | 296/96.21 |
| 6,279,983 B1 | * | 8/2001 | Biondo et al. | 296/93 |
| 6,332,640 B1 | * | 12/2001 | Cornils et al. | 296/93 |
| 6,824,197 B2 | * | 11/2004 | Benedetti | 296/146.15 |
| 7,188,885 B2 | * | 3/2007 | Schlater et al. | 296/96.21 |

FOREIGN PATENT DOCUMENTS

| | | | |
|---|---|---|---|
| EP | 404622 A1 | * | 12/1990 |
| JP | 01101220 A | * | 4/1989 |
| JP | 03246116 A | * | 11/1991 |
| JP | 05024434 A | * | 2/1993 |
| JP | 06072145 A | * | 3/1994 |

OTHER PUBLICATIONS

2004 Ford Freestar.

* cited by examiner

*Primary Examiner*—Glenn Dayoan
*Assistant Examiner*—Paul A Chenevert

(57) ABSTRACT

Fixed windshield panes, rear window panes and quarter window panes are mounted on adhesive beads deposited on flanges in respective openings in the bodies of vehicles. In order to maintain a gap between a top edge of one of these fixed window panes and a roof panel, a pair of spacers, made of foam material, are positioned between the bead of adhesive and a rim portion of the roof panel prior to mounting the fixed glass pane. The spacers each have a first portion adjacent the bead and a second portion between the top edge of the fixed glass pane and the rim. Either during or after curing of the bead of adhesive retaining the fixed glass window pane, the second portions of the spacers are torn away leaving open the gap between the top edge of the fixed glass pane and the roof panel at locations of the spacers.

14 Claims, 4 Drawing Sheets

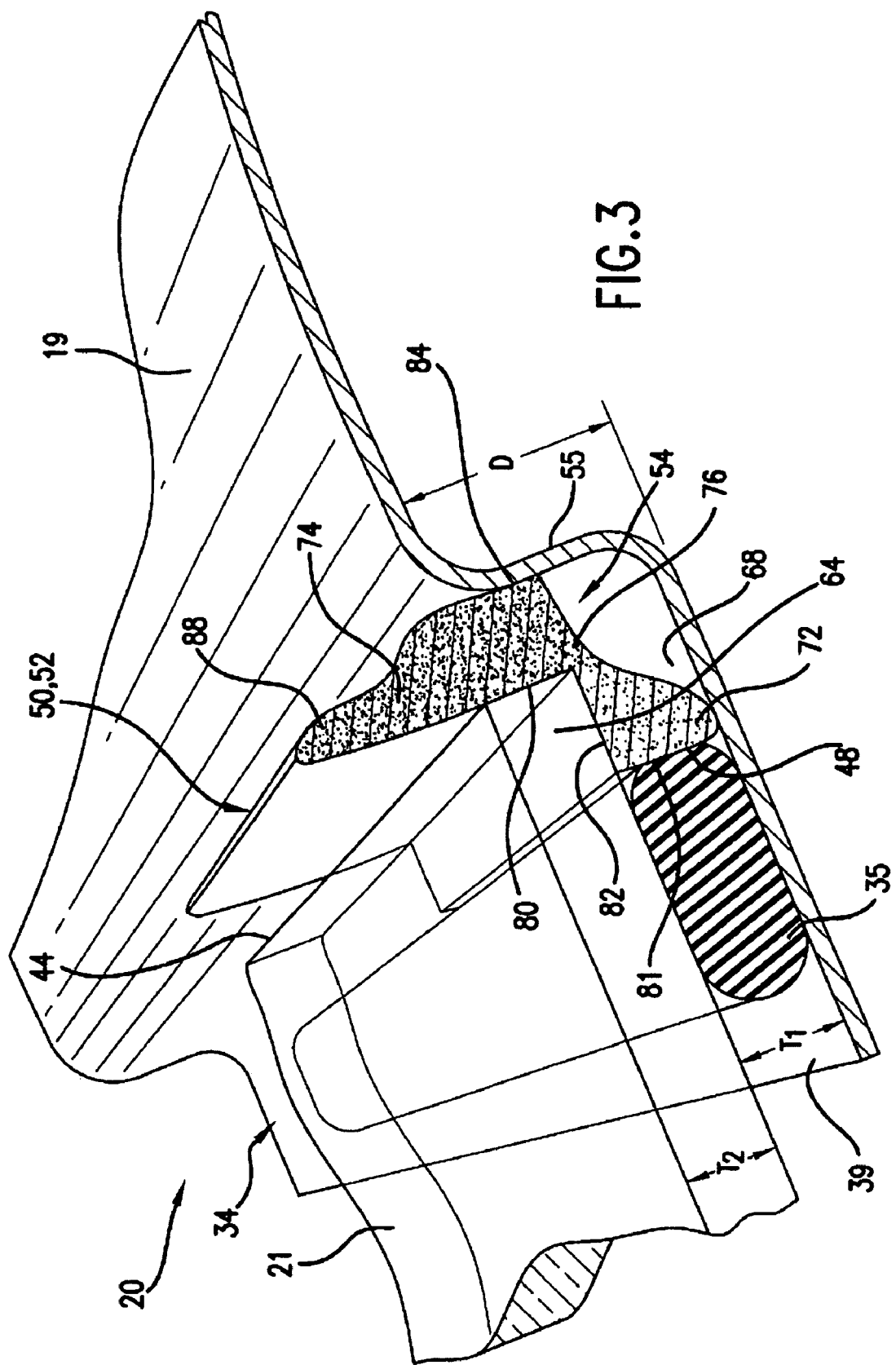

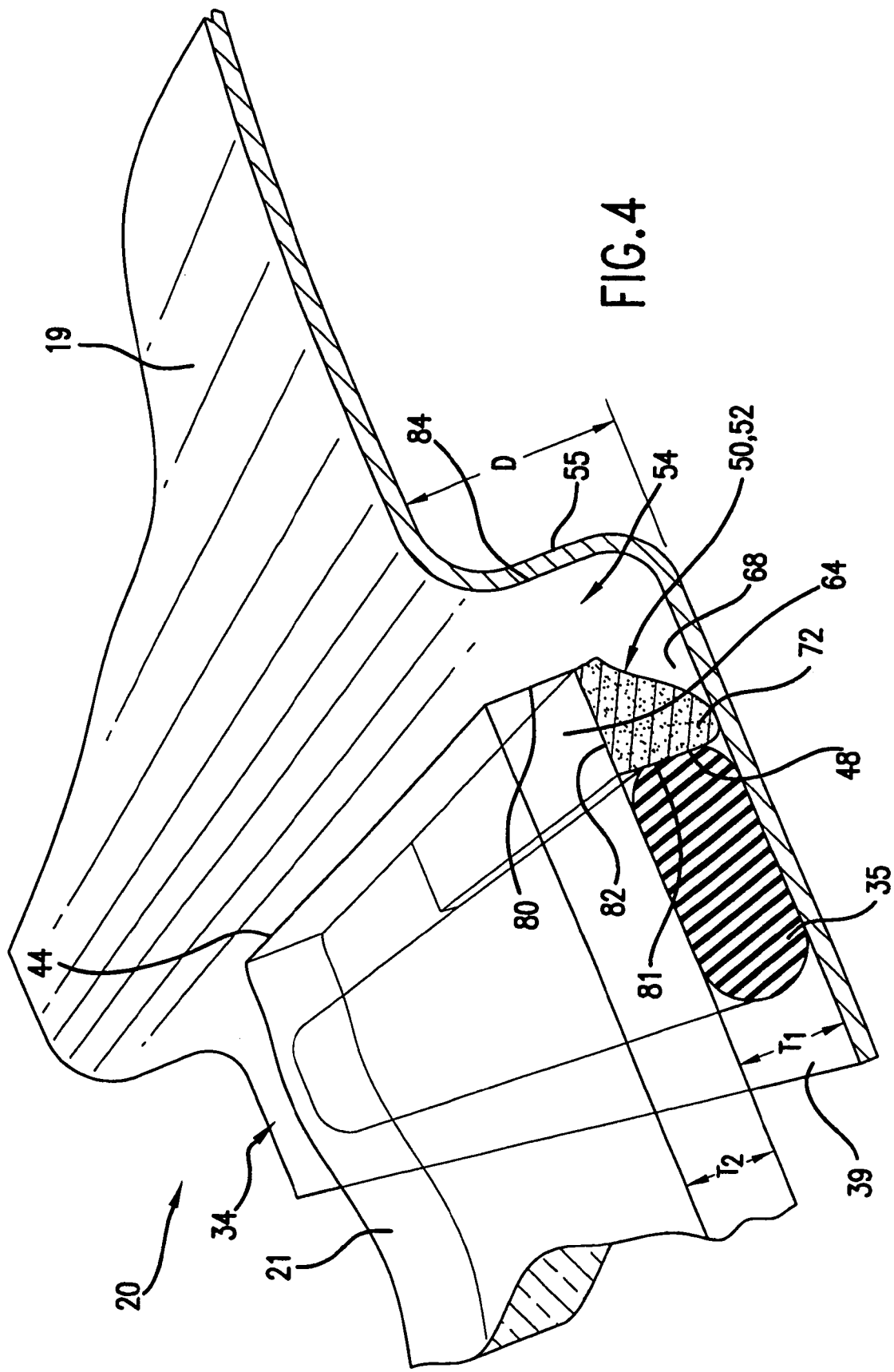

US 7,604,280 B2

DEVICES AND METHODS FOR LOCATING FIXED GLASS PANES ON AUTOMOTIVE VEHICLES

FIELD OF THE INVENTION

The present invention is directed to devices and methods of locating fixed glass panes on automotive vehicles. More particularly, the present invention relates to devices and methods for locating fixed glass windshield panes, rear window panes and quarter window panes in front, rear and side windows of passenger compartments of automotive vehicles.

BACKGROUND OF THE INVENTION

Automotive vehicles generally include a passenger compartment that is partially defined by a windshield pane supported by a pair of pillars projecting up from a lower portion of the passenger compartment. The pillars are connected to one another at top ends thereof by either a roof panel or header which supports the windshield pane in a window opening disposed adjacent to a top edge of the windshield pane. If the vehicle is a soft top convertible, then only the top edge of the windshield pane needs to be located with respect to the header, however if the vehicle is a hard top with a fixed roof panel, then both the windshield pane and the top edge of the rear window pane need to be located with respect to the roof panel. Some vehicles, primarily some trucks, have quarter windows of fixed glass which require location of top edges with respect to roof panels.

It has been decided with many automotive designs that in order to decrease expense, windshield, rear window and quarter window molding strips may be eliminated because such molding strips in some situations are not considered a necessary design feature. However, molding strips have an added function of locating the top edge of a windshield pane, rear window pane, or quarter panel pane by having spacers unitary with the molding strip to keep the windshield out of direct engagement with the roof panel of the vehicle. It is important to maintain a gap between the roof of an automobile and fixed glass panes in order to prevent creation of mechanical and thermal stresses between the roof panel and fixed glass panes, which stresses can cause fracturing of the fixed glass panes.

One alternative is to position relatively hard locators between fixed glass and roof panels. These hard locators are removed with a quarter turn, however the hard locators may increase mechanical stress between the roof panel and fixed glass by applying mechanical force to the edge of the fixed glass.

In view of the aforementioned considerations, there is a need for a device and method which allows for retention of a gap between the fixed glass of a windshield, back window or quarter window and the roof of a vehicle during installation, without using molding strips and without using elements that could damage the fixed glass.

SUMMARY OF THE INVENTION

In view of the aforementioned considerations, the present invention is directed to an arrangement for locating a fixed glass pane in a window opening of a passenger compartment of an automotive vehicle, the window opening being defined by a flange set back from an outer surface of the passenger compartment by a rim (or rabbit) of selected depth. A bead of adhesive adheres the glass pane to the flange, with the glass pane having an upper edge facing the rim, but spaced therefrom by a gap, and with the glass pane having an edge portion at least initially extending beyond the bead. The gap is maintained during mounting of the glass pane in the window opening by at least one spacer of foam material, which spacer has a first portion disposed beneath the glass pane and adjacent to the bead of adhesive and by a second portion positioned between the edge of the glass pane and rim. The first and second portions are connected by a weakened portion to facilitate tearing away the second portion after the adhesive is at least partially cured.

In a further aspect of the arrangement, the weakened portion of the spacer is a third portion of reduced thickness with respect to the first and second portions.

In a further aspect of the arrangement, the foam material comprising the spacer is polyvinylchloride or urethane foam.

In a further aspect of the arrangement, there are at least two spacers having a width in a range of about 25 mm to 150 mm.

In a further aspect of the arrangement, there are two spacers each having a width of about 75 mm.

In still a further aspect of the arrangement, the fixed glass pane is a windshield, rear window pane or quarter window pane.

The present invention is also directed to a method of locating a pane of glass to be fixed in a window opening of a passenger compartment of an automotive vehicle, the window opening being defined by a flange set back from a surface of the passenger compartment by a rim of selected depth. The method comprises depositing an adhesive bead on the flange, wherein the bead has a thickness less than the depth defined by the rim. At least one spacer of foam material is then disposed between the bead of adhesive and the rim. The spacer has a first portion extending from the adhesive bead toward the rim and a second portion being positioned to establish a gap between a top edge of the glass pane and the rim. The glass pane is then positioned in the window opening abutment with a bead of adhesive, with the edge of the glass pane spaced from the rim by the second portion of the spacer. Either after the bead of adhesive has partially cured or completely cured, the second portion of the spacer is separated from the first portion of the spacer to open the gap between the edge of the glass pane and rim at the location of the spacer.

The method further comprises at least initially positioning the pane of glass so that a portion of the pane of glass adjacent the edge of the pane of glass extends beyond the bead of adhesive and overlies the first portion of the spacer.

In still a further aspect of the method, tearing of the spacer is facilitated by providing the spacer with a reduced thickness in a third portion thereof that connects the first portion to the second portion.

In a further aspect of the invention, the method comprises positioning a first spacer in the gap at a location proximate a first vertically extending edge of the pane of glass and a second spacer in the gap proximate a second vertically extending edge of the pane of glass.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is an enlarged elevation in perspective of one of a pair of spacers shown in FIG. 2, and FIG. 4 is a view similar to FIG. 3, but showing a portion of the spacer removed.

DETAILED DESCRIPTION

Figure 1:
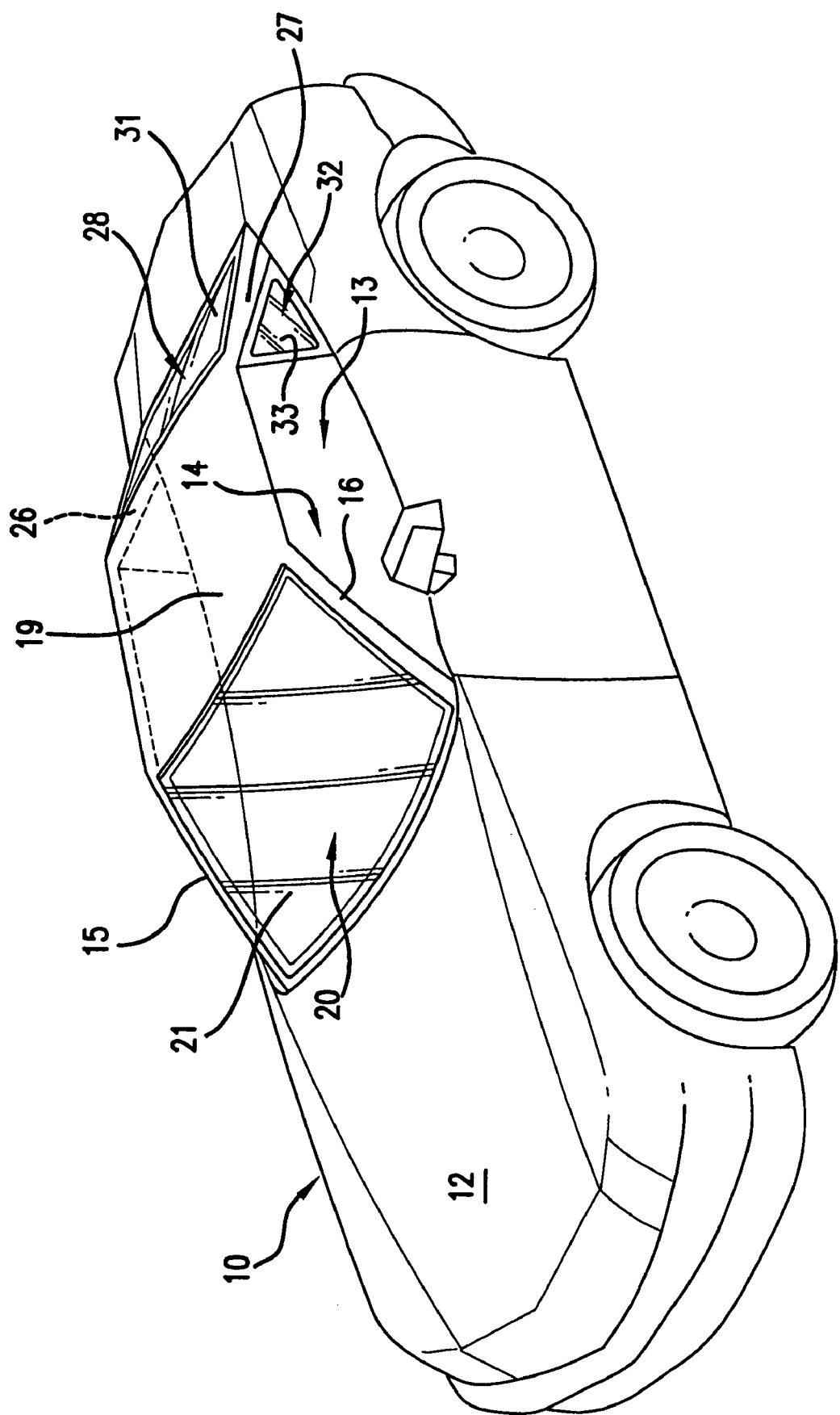
FIG. 1 is a perspective view of an automotive vehicle having a fixed glass windshield pane, a fixed glass rear window pane and fixed glass quarter panes.

Referring now to FIG. 1, there is shown an automotive vehicle 10 having a lower body portion 12 with a passenger compartment 13 having an upper portion 14 partially defined by a pair of roof pillars 15 and 16. The roof pillars 15 and 16 extend upwardly from the lower body portion 12 and are connected to a roof panel 19 to provide a front window opening 20 that receives a glass windshield 21 fixed in the front window opening. The roof panel 19 terminates in rear pillars 26 and 27 which extend from the body 12, and in combination with the roof panel 19, define a rear window opening 28 that receives a glass rear window pane 31 fixed therein. A quarter window 32 also of fixed glass 33 is occasionally provided in some automotive vehicles 10, primarily in trucks.

Figure 2:
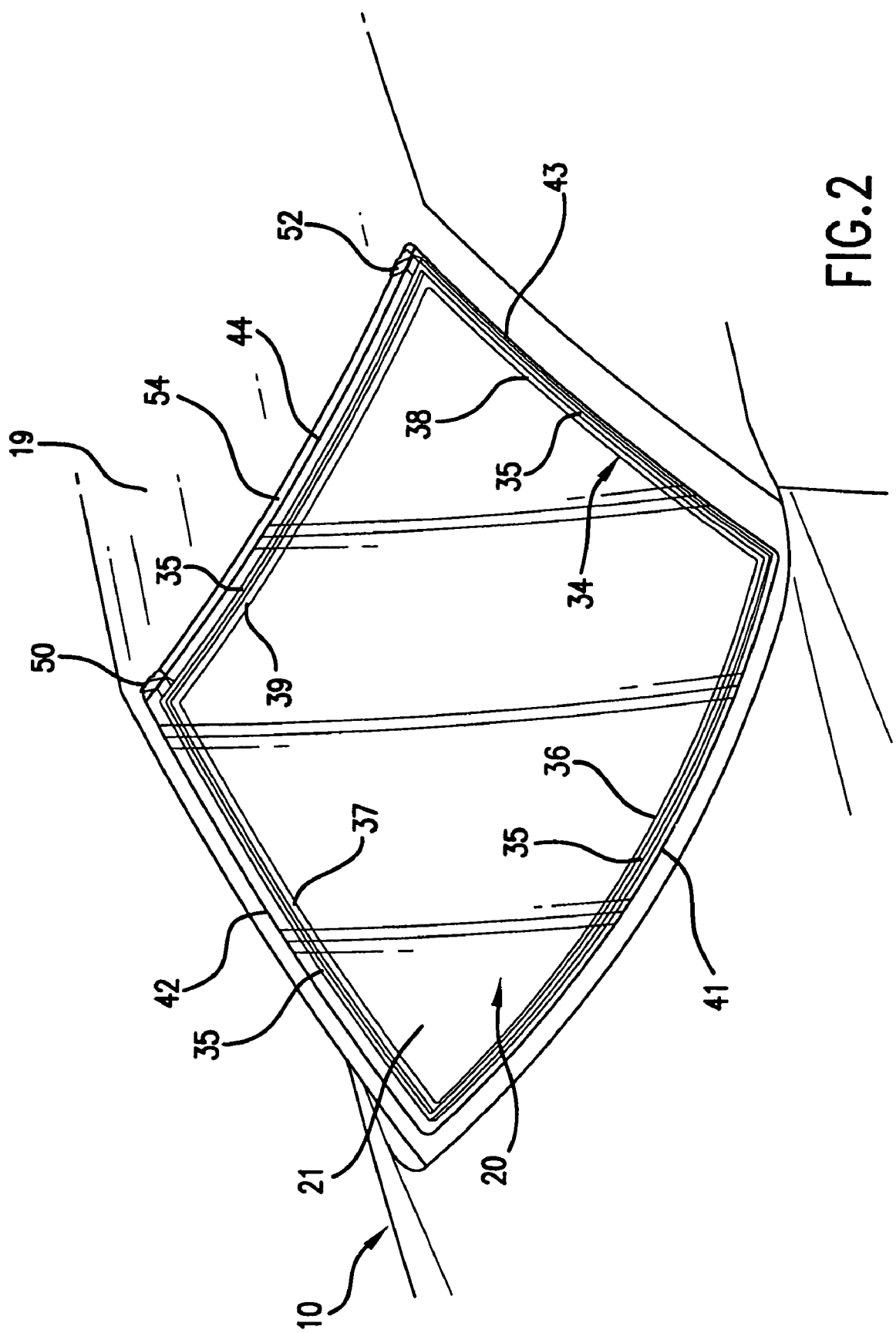
FIG. 2 is a front perspective view of a front portion of the vehicle of FIG. 1.

Referring now to FIG. 2, where the glass windshield 21 is shown mounted in the opening 20, the glass windshield is adhered to a peripheral mounting flange 34 within the opening 20 by a bead of adhesive 35. The peripheral mounting flange 34 has a bottom flange 36, a pair of side flanges 37 and 38 and a top flange 39 which define the window opening 20 closed by the glass windshield 21. The windshield 21 has a bottom edge 41, a pair of side edges 42 and 43 and a top edge 44. In accordance with the present invention, a pair of spacers 50 and 52 are used to provide a gap 54, which gap is between the roof 19 and the top edge 44 of the windshield 21. The gap 54 prevents the roof panel 19 from engaging the top edge 44 of the glass windshield 21 which could stress the fixed glass of the windshield. In order to maintain the width of the gap 54, the pair of spacers 50 and 52 are installed to define the gap 54 prior to installing the windshield 21.

In the enlarged view of FIG. 3, one of the spacers 50 or 52 shown adjacent to the roof panel 19 which is connected to the upper flange 39 by a rim (or rabbit) 55 which places the flange at a selected depth D from the top surface of the roof panel 19. The depth D accommodates the thickness $T_1$ of the bead of adhesive 35 and a thickness $T_2$ of the pane of glass forming the windshield 21. The bead of adhesive 35 extends completely along the top flange 39, along each of the side flanges 37 and 38, and the bottom flange 36, which flanges together with the top flange 39 comprise the peripheral mounting flange 34. In FIG. 3, the bead of adhesive 35 has a schematically illustrated thickness $T_1$ and shape which changes as the bead spreads and compresses due to the windshield 21 pressing against the bead as the bead solidifies during cure. An edge portion 64 of the glass pane 21, which is adjacent to the top edge 44 of the glass windshield 21, projects beyond the bead of adhesive 35 to provide a space 68 between the top flange 39 and the edge portion 64.

In order to positively maintain the gap 54 between the top edge 44 of the windshield 21 and the rim 55, the spacers 50 and 52 are utilized. The spacers 50 and 52 are put in place between the bead of adhesive 35 and the rim 55 prior to positioning the glass windshield 21 against the bead of adhesive. Each of the spacers 50 and 52 has three portions, a first portion 72, a second portion 74 and a third portion 76 that connects the first portion to the second portion. The first portion 72 is preferably substantially triangular in shape and fits generally in the space 68 beneath the over hanging edge portion 64 of the windshield 21, while the second portion 74 extends in the gap 54 between the top edge 44 of the windshield 21 and the rim 55 projecting inwardly from the roof 19. When the windshield 21 is positioned against the bead of adhesive 35, it is usually gripped by suction cups controlled manually by an operator or controlled by a robot which set the windshield 21 in the window opening 20 with the top edge 44 of the windshield in abutment with surfaces 80 on the second portions 74 of spacers 50 and 52, which second portions are generally flat and establish the gap 54. The overhanging edge portion 64 of the glass windshield 21 engages upper flat surfaces 82 on the first portions 72 of the spacers 50 and 52. The upper flat surfaces 82 help keep the respective spacers 50 and 52 properly oriented with the surfaces 80 parallel to the top edge 44 of the glass windshield 21 as the bead of adhesive 35 dries. The first portions 72 of the spacers 50 and 52 have side surfaces 81 placed at 48 against the bead of adhesive 35 as the bead cures and therefore can become adhered to the bead. The second portions 74 of the spacers 50 and 52 have surfaces 84 which abut the rim 55 to maintain the gap 54 (see also FIG. 2).

As is seen in FIG. 3 and FIG. 4, it is desirable to remove the second portions 74 of the spacers 50 and 52. This is accomplished by tearing the spacers 50 and 52 through their third portions 76. Since the surfaces 80 and 84 of the second portions 74 are adhered neither to the top edge 44 of the windshield 21 or the rim 55, the second portions 74 of the spacers 50 and 52 separate easily from the first portions 72 so that the presence of the spacers 50 and 52 is not visible to ordinary observers in the gap 54, the first portion 72 being beneath the overhanging edge portion 64 of the glass and not in the gap 54. Preferably, the second portions 74 of the spacers 50 and 52 are torn while the bead of adhesive 35 is still curing, but if necessary or desired, then second portions 74 may be separated after curing.

In a preferred embodiment, the spacers 50 and 52 are made of a foam material, such as, but not limited to urethane foam or polyvinylchloride foam. In order to facilitate tearing at the weakened third portion 76, the second portion 74 of the spacers 50 and 52 may be made denser than the first portion 72. In order to provide convenient separation, the second portion 74 has a tear tab 88 which is flexible and easily gripped for tearing the second portion 74 from the first portion 72.

Preferably, the adhesive of the bead of adhesive 35 is urethane adhesive which provides a relatively rigid mount and seal with respect to the mounting flange 34, yet provides a degree of cushioning for the windshield 21 while keeping the glass windshield 21 spaced from the rim 55.

The thickness $T_2$ of the glass windshield 21 is between about 4.4 to 6 mm, while the depth D provided by the rim 55 is 6 to 8 mm. Accordingly, the thickness $T_1$ of the urethane bead 35 is at least initially about 2 mm in its cured state.

While two spacers 50 and 52 are shown, an alternative is to use a single spacer 50 or 52 extending across a substantial portion or the entire length of the top edge 44 of the glass windshield 21. While two spacers 50 and 52 of about 75 mm in width provide sufficient spacing of the glass windshield 21 from the rim 55 extending down from the roof panel 19, another alternative is to use three or more spacers.

The spacers 50 and 52 are shown used with a windshield 21, however automotive vehicles that have a rear window pane 31 (see FIG. 1) that is fixed, may also use spacers similar to the spacers 50 and 52 or the aforementioned alternatives thereto. This provides a gap 54 between the roof panel 19 and the rear window pane 31, with the rear window pane being held in place using a bead of adhesive similar to the bead 35 of FIG. 3. Moreover, vehicles that have a quarter window 32 with a fixed glass pane 33 (see FIG. 1) can also utilize spacers, such as the spacers 50 and 52 of FIGS. 2-4.

From the foregoing description, one skilled in the art can easily ascertain the essential characteristics of this invention, and without departing form the spirit and scope thereof, can make various changes and modifications of the invention to adapt it to various usages and conditions.

I claim:

1. An arrangement for locating a glass pane in a window opening in a passenger compartment of an automotive vehicle comprising:
   a flange set back from an outer surface of the passenger compartment by a rim of a selected depth;
   an adhesive bead on the flange adhering the glass pane to the flange with the glass pane having a top edge spaced from the rim and extending beyond the adhesive bead; and
   at least one spacer of foam material disposed between and in contact with both the adhesive bead and the rim, the at least one spacer having;
      a first portion disposed beneath the glass pane and abutting the adhesive bead along substantially an entire thickness of the first portion;
      a second portion extending away from the flange and having a thickness substantially equal to a desired gap between the top edge of the glass pane and the rim; wherein the second portion is disposed between the top edge of the glass pane and the rim so that the top edge of the glass pane is spaced from the rim by the second portion;
   wherein the second portion abuts the rim and only one edge of the glass pane so as to establish a gap between the top edge of the glass pane and the rim;
   wherein the thickness of the second portion is substantially uniform along a thickness of the top edge of the glass pane; and
      a third portion connecting the first portion and the second portion to facilitate tearing away the second portion after the adhesive bead is cured so that a presence of the spacer is not visible in the gap.

2. The arrangement of claim 1 wherein the foam material is polyvinyl chloride or urethane.

3. The arrangement of claim 1 wherein the foam comprising the second portion of the spacer is of a higher density than the foam of the first portion of the spacer.

4. The arrangement of claim 1 wherein there is one spacer having a length substantially the same as the length of the top edge of the pane of glass.

5. The arrangement of claim 1 wherein the glass pane is a windshield, a rear window pane or a quarter window pane.

6. The arrangement of claim 1 wherein the third portion of the spacer has a thickness less than the first or second portions.

7. The arrangement of claim 1 wherein the foam comprising the second portion of the spacer is of a higher density than the foam of the first portion of the spacer.

8. The arrangement of claim 1 wherein there are at least two spacers.

9. The arrangement of claim 8 wherein the spacers have a width in the range of 25 to 150 mm.

10. The arrangement of claim 9 wherein the spacers have a width of about 75 mm.

11. A method of locating a glass pane to be fixed in a window opening in a passenger compartment of an automotive vehicle, wherein the window opening is defined by a flange set back from an outer surface of the passenger compartment by a rim defining a selected depth, the method comprising:
   depositing an adhesive bead on the flange;
   after said depositing, disposing at least one spacer of foam material between and in contact with both the adhesive bead and the rim, the at least one spacer having;
      a first portion abutting the adhesive bead along substantially an entire thickness of the first portion and extending from the adhesive bead toward the rim; and
      a second portion extending away from the flange and having a thickness substantially equal to a desired gap between the top edge of the glass pane and the rim;
   after said disposing, positioning the glass pane in abutment with the adhesive bead and the second portion so that the top edge of the glass pane is spaced from the rim by the second portion of the spacer;
   wherein the second portion abuts the rim and only one edge of the glass pane so as to establish the desired gap between the top edge of the glass pane and the rim;
   wherein the thickness of the second portion is substantially uniform along a thickness of the top edge of the glass pane; and
      after said positioning, separating the second portion of the spacer from the first portion of the spacer to open the gap between the top edge of the glass pane at the location of the spacer so that a presence of the spacer is not visible in the gap.

12. The method of claim 11 wherein a portion of the glass pane extends beyond the bead of adhesive and overlies the first portion of the spacer.

13. The method of claim 12 wherein the spacer has a weakened third portion connecting the first portion to the second portion and wherein the second portion is separated from the first portion by tearing.

14. The method of claim 13 further comprising removing the second portion from the first portion by tearing.

* * * * *